United States Patent
Pesonen et al.

(10) Patent No.: US 10,396,989 B2
(45) Date of Patent: Aug. 27, 2019

(54) METHOD AND SERVER FOR PROVIDING TRANSACTION KEYS

(71) Applicant: GIESECKE & DEVRIENT GMBH, München (DE)

(72) Inventors: Lauri Pesonen, Espoo (FI); Ulrich Weinert, München (DE); Jarmo Mikael Kaikkonen, Espoo (FI); Jay Graver, Newmarket (CA)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 169 days.

(21) Appl. No.: 15/525,717

(22) PCT Filed: Nov. 9, 2015

(86) PCT No.: PCT/EP2015/002245
§ 371 (c)(1),
(2) Date: May 10, 2017

(87) PCT Pub. No.: WO2016/074781
PCT Pub. Date: May 19, 2016

(65) Prior Publication Data
US 2017/0324560 A1 Nov. 9, 2017

(30) Foreign Application Priority Data

Nov. 11, 2014 (EP) .................................... 14003796

(51) Int. Cl.
*H04L 29/00* (2006.01)
*H04L 9/32* (2006.01)
(Continued)

(52) U.S. Cl.
CPC .......... *H04L 9/3228* (2013.01); *H04L 9/0822* (2013.01); *H04L 9/0863* (2013.01);
(Continued)

(58) Field of Classification Search
CPC ... H04L 9/3228; H04L 63/105; H04L 9/0863; H04L 63/067; H04L 9/0822;
(Continued)

(56) References Cited

U.S. PATENT DOCUMENTS

| 9,059,980 B2* | 6/2015 | Kean | H04L 9/3234 |
| 2006/0107037 A1* | 5/2006 | Lincoln | G06F 21/12 713/155 |
| 2009/0222383 A1* | 9/2009 | Tato | G06Q 20/12 705/71 |

FOREIGN PATENT DOCUMENTS

| WO | 0106701 A1 | 1/2001 |
| WO | 2010010430 A2 | 1/2010 |

(Continued)

OTHER PUBLICATIONS

Extended European Search Report for corresponding European Application No. 14003796.1, dated May 6, 2015.
(Continued)

*Primary Examiner* — Brandon S Hoffman
*Assistant Examiner* — Helai Salehi
(74) *Attorney, Agent, or Firm* — Workman Nydegger

(57) ABSTRACT

A method and a server for providing transaction keys for a transaction system includes transaction units which use pre-delivered transaction keys, and are provided by a key provisioning server and wherein the transaction key usage is checked by a transaction checking server. A transaction key is derived from a master key of a transaction unit, wherein a varying derivation parameter is used in the step of deriving. The step of deriving comprises a first sub step of deriving a key from the master key and a second sub step of deriving the transaction key from the derived key. The first sub step or the second sub step of deriving is performed dependent on a security level of the transaction unit.

12 Claims, 1 Drawing Sheet

(51) Int. Cl.
*H04L 9/08* (2006.01)
*H04L 29/06* (2006.01)

(52) U.S. Cl.
CPC .......... *H04L 63/062* (2013.01); *H04L 63/067* (2013.01); *H04L 63/105* (2013.01); *H04L 63/126* (2013.01); *H04L 2209/56* (2013.01); *H04L 2463/062* (2013.01)

(58) Field of Classification Search
CPC . H04L 63/126; H04L 2209/56; H04L 9/0838; H04L 9/0841; H04L 9/0844; H04L 9/0847
See application file for complete search history.

(56) References Cited

FOREIGN PATENT DOCUMENTS

| WO | WO-2010010430 A2 | * | 1/2010 | ........... H04L 9/0844 |
|----|------------------|---|--------|------------------------|
| WO | 2013050153 A1 | | 4/2013 | |
| WO | WO-2013050153 A1 | * | 4/2013 | ......... G06Q 20/3278 |

OTHER PUBLICATIONS

International Search Report for corresponding International PCT Application PCT/EP2015/002245, dated Feb. 4, 2016.

\* cited by examiner

METHOD AND SERVER FOR PROVIDING TRANSACTION KEYS

BACKGROUND

The present invention relates to a method and to a server for providing transaction keys for a transaction system.

Transaction systems using single-use transaction keys are known in the area of contactless, e.g. NFC or RFID, transactions of mobile devices. Typically, the keys are provided locally by secure elements of the mobile device, e.g. the SIM card. Alternatively, in other systems the transaction keys may be calculated centrally for being delivered to the transaction unit, preferably before the transaction commences.

In some systems the transaction terminal may transparently perform transactions with transaction units implemented differently. In this regard the contactless payment system of WO 2013 050153 proposes that the terminal should receive an operating mode information from the local device.

SUMMARY

It is the object of the present invention to improve the security of systems using transaction keys pre-delivered from a server and in particular to improve the security of the master key of the transaction unit used for deriving the transaction key.

In particular transaction systems using the same key derivation method for differently implemented transaction units may not be perfectly secured.

The present method provides a transaction key in a server of a transaction system. Transaction units of the transaction system use pre-delivered transaction keys. The method comprises a step of deriving a transaction key from a master key of a transaction unit. In the step of deriving a varying derivation parameter, such as a random number, a counter or a time stamp, is used. The step of deriving comprises a first sub step of deriving a key from the master key and a second sub step of deriving the transaction key from the derived key. The first sub step or the second sub step of deriving is performed dependent on a security level of the transaction unit.

The master key of the transaction unit, i.e. the individual master key, thus is protected more reliably even though an attacker of the system may have discovered one or more transaction keys.

Furthermore, a counter-part of the transaction unit in the transaction, the transaction partner, which typically will be a terminal, performs transactions with differently implemented transaction units without effecting security. Identical application software of the transaction partner and/or an identical interface of the transaction partner to transaction units and to the transaction system, including a transaction checking server, can be used for transaction units having different security levels assigned.

In the present context the transaction key is a single-use transaction key. Each transaction key can be used once only.

A transaction unit identifier identifies the transaction unit. Preferably, the identifier will be used in one of the sub steps of deriving. Moreover, the identifier may be used for receiving the individual master key of the transaction unit. Finally, the transaction unit identifier may also be used to determine the security level of the transaction unit based on security level information stored for each transaction identifier.

In the context of the present application the following wording is used. A security element based transaction unit is a transaction unit executed on a security element. Examples for security elements are chip cards (portable SIM cards), embedded SIMs, embedded secure elements (NFC-Chip, TPM chip, SAM module) or other hardware security elements (USB-Token). Security elements may be reversibly inserted into or embedded in a device (the host). A host based transaction unit is a transaction unit executed on the processor of the host. The host still may comprise secure elements, which however do not use the transaction key for creating transaction data. A server based transaction unit is a transaction unit executed in a server for a device. Hence, in a host, secure element or server based transaction unit the transaction key is only used in the host, secure element or server respectively.

In a first operating mode the first derivation sub step is performed for host based transaction units, host based transaction units having the security level "low". In a second operating mode the first derivation step is not performed for security element based transaction units, security element based transaction units having the security level "high".

The increased security is established for host based transaction units selectively. Thus the transaction system basically is not amended for transactions of security elements. However, it should be considered that an existing security element is now used for receiving transaction keys (instead of generating them itself).

In a preferred variation a third operating mode is provided, wherein the first derivation step is performed for server based transaction units, server based transaction units having the security level "medium".

Server based transaction units may either use virtual or physical security elements. The server based units partly suffer from non-local execution and correspondingly required data transfer, however the transaction key is not transferred but used on the server only. Nevertheless, the execution environment of the server is considered to be potentially less secure.

Preferably, in one of the two sub steps of deriving a one-way function, like a Hash function, is used whereas in the other sub step a reversible function, like DES or 3DES, is used for key derivation. In the preferred solution, in the first sub step, the one-way function is applied to the transaction unit identifier. The server may use a selection parameter in order to select one one-way function from a plurality of usable one-way functions.

The server may provide the derived transaction key to the transaction unit. The server can be called the key-provisioning server. The server encrypts the transaction key before sending the encrypted transaction key to the transaction unit. The step of encryption is adapted for encrypted storage in the transaction unit. Hence, it is particularly not a transport layer encryption.

In an improved version multiple transaction keys are provided, wherein the encryption is adapted to allow decryption of a single transaction key, the further keys remaining encrypted. A further improvement could be achieved if the key is decrypted for the pending transaction—transaction based decryption. Finally, the decryption could be limited by the encryption method, e.g. by requiring consecutive decryption, e.g. decryption of present key requires input from previous transaction key decryption.

The server may check the transaction data created by a transaction unit, using a received (alleged) transaction key, by deriving the transaction key and using the derived transaction key for checking the transaction data. For example, the server may recalculate a (symmetric) signature for the transaction and compare the recalculated signature with a signature included in the transaction data.

A proposed system includes a key-provisioning server and/or a transaction checking server as well as multiple transaction units using pre-delivered transaction keys.

It is an important aspect of the present invention to introduce a sub step in a key derivation, the sub step being performed dependent on the security level of the transaction unit. By performing the same sub step in a server providing the key and in a server checking the transaction data created by using the key, neither the transaction units nor their counter-parts, transaction terminals, would have to be changed. However, the transaction unit may be adapted for further improvements.

BRIEF DESCRIPTION OF THE DRAWINGS

Preferred embodiments of the invention will now be described in more detail with reference to the figures.

DETAILED DESCRIPTION OF VARIOUS EMBODIMENTS

Figure 2:
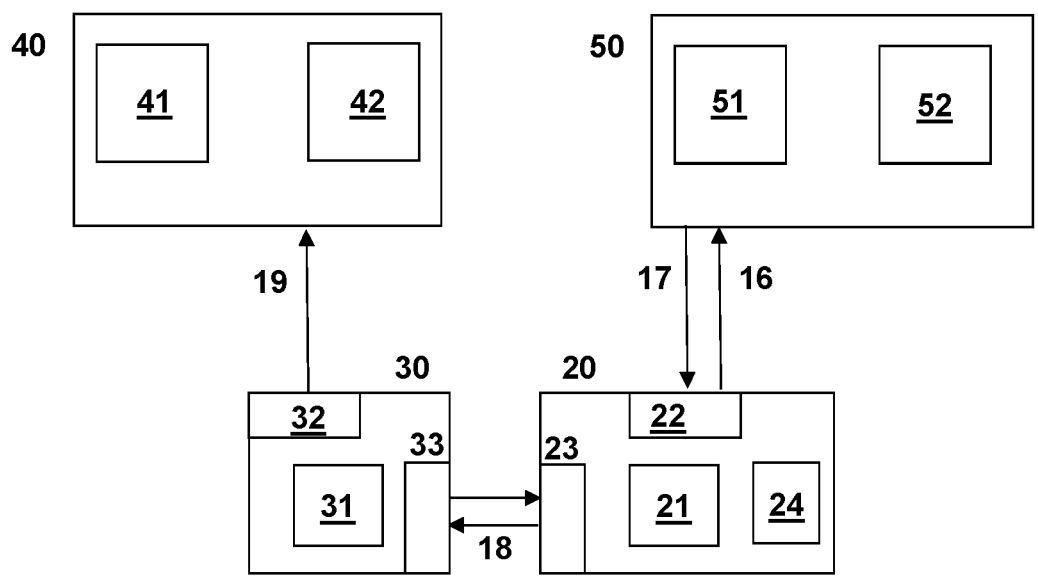
FIG. 2 illustrates the main components of the transaction system.

The present solution will now be described for a contactless mobile payment transaction system. The basic components of the transaction system, illustrated in FIG. 2, are a host based transaction unit 21 in a device 20, a transaction terminal 30, a key provisioning server 50 and a transaction checking server 40.

At least one transaction key required for the transaction is derived in the key provisioning server 50 and sent 17 in advance from the key provisioning server 50 to the transaction unit 21. Thus the transaction unit 21 and the terminal 30 can perform a contactless transaction via local data exchange 18. Transaction data created by using the transaction key are sent 19 to the transaction checking server 40. The transaction checking server 40 also derives the transaction key and checks or verifies the received transaction data.

Figure 1:
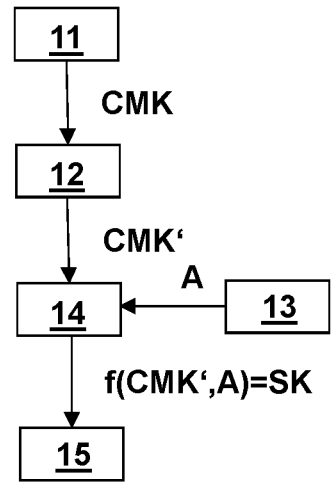
FIG. 1 illustrates steps performed on a key provisioning or transaction checking server.

Turning now to FIG. 1 the key derivation process will be described, which is performed in the server(s).

Initially the server determines 11 the master key CMK of a transaction unit for which a transaction key has to be derived. The transaction unit may be identified by a transaction unit identifier, wherein the transaction unit identifier is used for determining the master key CMK. Instead of directly using this master key, which is an individual key for the identified transaction unit already, a first sub step 12 of derivation is performed. The unit individual master key CMK may be derived from a further, e.g. transaction system operator or unit issuer, master key IMK.

In sub step 12 of the key derivation a one-way function, like a hash function, is applied to the transaction identifier. The one-way function to be used may be configured based on a function parameter. Multiple different one-way functions may be selected in the server. Furthermore, in sub step 12, the result of the applied one-way function is combined, via XOR, DES or 3DES, with the master key CMK, thereby deriving a modified master key CMK' for the second key derivation sub step 14. The function of sub step 12 shall be specific per transaction system operator and/or unit issuer. Furthermore, the function shall be secret.

In sub step 14 a reversible function, like XOR, DES, or 3DES, is used for deriving the transaction key SK based on the modified master key CMK' and a varying derivation parameter A determined 13 for the key derivation of a transaction key for the transaction unit. The session key SK is derived from the modified master key and the derivation parameter: SK=f(CMK',A). The varying derivation parameter could be a time-dependent value, a pseudo random number or a transaction counter. Preferably, the derivation parameter is also determined based on the known transaction unit identifier.

Finally, if the steps 11 to 14 are performed by a key derivation unit 51 of the key provisioning server, in step 15 the at least one derived transaction key is storage encrypted 15 for the transaction unit 20 and transmitted to the transaction unit 20.

If however the steps 11 to 14 are performed by a key derivation unit 41 of the transaction checking server 40, the derived transaction key is finally used in step 15 for checking transaction data.

In a second operating mode, particularly if the security level of the transaction unit is determined to be high, sub step 12 is skipped and the master key CMK is directly used for key derivation sub step 14.

Returning now to FIG. 2, both servers 40 and 50 further comprise repositories 42 and 52 respectively. The repository 42, 52 stores any data required for the key derivation process. For example, the repository 42, 52 stores one or more of:

a security level per transaction unit,
the master keys per transaction unit,
a most recent value of the varying derivation parameter (per transaction unit),
the selection parameters for the one-way functions,
a counter for the current number of transaction keys available on the transaction unit, increased upon transmission by server 40 and decreased after use in transactions by server 50.

The repositories 42, 52 should be synchronised such that, at least for the terminal 30, the transmitted data 18 and 19 remain unchanged.

A request for transaction keys may be sent 16 from the transaction unit 21 to the key provisioning server 50. In a preferred solution the transaction unit 21 automatically requests further transaction keys, if a number of stored transaction keys falls under a predetermined number. Alternatively, the transaction unit 21 regularly triggers the key provisioning server 50, which determines whether further transaction keys would have to be sent and/or whether stored transaction keys have to be deleted or modified.

In the illustrated embodiment the transaction unit 21 is a host based transaction unit of the device 20. The device comprising a network interface 22 for communicating 16, 17 with the server 50 and a local interface 23 for performing 18 the transaction with a terminal 30. The network interface 22 may be a (mobile) telecommunication or internet interface. The local interface 22 may be a RFID, UHF, NFC or Low Energy Bluetooth interface. Security elements like a SIM card or a secure NFC unit (which could be a part of unit 23), are not illustrated, but may exist in device 20 and may have their own transaction unit. The terminal 30 basically may comprise similar interfaces 33 and 32 for local and/or network communication. Since, the present solution is particularly designed to leave the transaction software 31 of the terminal 30 unamended, no further description appears required.

Hence, multiple transaction units of a device, executed on the host and/or the security elements, may receive transaction keys form the key provisioning server. Depending on their security level the key derivation process will differ.

Furthermore, a transaction proxy on the device 20 may use a server based transaction unit. Hence, the key provisioning server 50 may provide transaction keys, derived in a third operating mode including sub step 12, to a non-illustrated server executing the transaction unit for (the transaction proxy of) the device 20.

For host based transaction units the device further may comprise a server-encrypted storage area 24. The key provisioning server 50 encrypts one or more transaction keys for encrypted storage in the storage area 24. In contrast to transport encryption approaches, the transmitted encrypted transaction keys remain encrypted until they are used. Accordingly, the server 50 will encrypt the transaction keys in such a way that they can be decrypted separately. In an even more improved version the encryption could be adapted to enforce consecutive decryption (e.g. by using 3DES in CBC mode or variation thereof), the next stored key thus cannot be decrypted without having decrypted the previous key. The request for transaction keys 16 for example could also include the number of used and/or decrypted transaction keys.

Finally, a step of checking 15 in the server 40 the transaction data received 19 from the terminal 30 shall be shortly described.

The received transaction data typically include transaction details, e.g. an amount and/or a transaction identifier, and a transaction check value, e.g. a checksum, MAC or signature created with the transaction key for the transaction details. Preferably the transaction details and/or the transaction data comprise the transaction unit identifier of the transaction unit and the varying derivation parameter.

The transaction checking unit 41 of the server 40 uses the transaction unit identifier to determine 11 the individual master key CMK of the corresponding transaction unit. Furthermore, it determines the security level of the transaction unit, and depending thereon performs sub step 12 or not. In sub step 14 the session key SK to be provided in the server 40 is derived (in the given mode). Any information required for the key derivation is stored in repository 42.

The session key SK re-derived in server 40 now can be used to check the transaction data in step 15. For example, the transaction check value may be re-calculated for the transaction, namely the transaction details, and the re-calculated value may be compared with the received transaction check value.

Although not illustrated in FIG. 2 the server 40 may confirm to the terminal 30 that the transaction has been successfully checked (approved by the system). Furthermore, FIG. 2 shows a direct communication between servers 40, 50 and terminal 30/device 20 respectively, nevertheless the transaction system may be more complex and include further components. For example, servers 40, 50 could be implemented on a single server or could be added as external service entities to any existing transaction system.

The invention claimed is:

1. Method for providing a transaction key in a server of a transaction system, in which transaction units of the transaction system use pre-delivered transaction keys, the method comprising:
providing a key-provisioning server, a transaction checking server, a transaction terminal, and at least one transaction unit;
deriving a transaction key from a master key of the at least one transaction unit in the key-provisioning server, wherein a varying derivation parameter is used in the step of deriving;
transmitting the derived transaction key from the key-provisioning server to the at least one transaction unit;
deriving the transaction key from the master key of the at least one transaction unit in the transaction checking server, wherein the varying derivation parameter is used in the step of deriving;
transmitting the derived transaction key from the transaction checking server to the transaction terminal; and
checking the derived transaction key from the key-provisioning server against the derived transaction key from the transaction checking server:
wherein
the step of deriving comprises
a first sub step of deriving a key from the master key; and
a second sub step of deriving the transaction key from the derived key;
wherein the first sub step or the second sub step of deriving is performed dependent on a security level of the at least one transaction unit;
wherein the first derivation step is not performed for high security level transaction units;
wherein in one of the two sub steps of deriving a one-way function is used and in the other sub step a reversible encryption function is used for key derivation;
wherein the one-way function is selected from a plurality of usable one-way functions.

2. The method according to claim 1 wherein transaction key is a single-use transaction key, wherein a transaction unit identifier is used in the step of deriving.

3. The method according to claim 1 wherein in a first operating mode the first derivation step is performed for host based transaction units, host based transaction units having the security level low.

4. The method according to claim 1 wherein in a second operating mode the first derivation step is not performed for security element based transaction units, security element based transaction units having the security level high.

5. The method according to claim 1 wherein in a third operating mode the first derivation step is performed for server based transaction units, server based transaction units having the security level medium.

6. The method according to claim 1 wherein the server stores security level information for the transaction units.

7. The method according to claim 1 wherein the one-way function is applied to the transaction unit identifier and/or selected from a plurality of usable one way functions.

8. The method according to claim 1 wherein the server provides the transaction key to the transaction unit.

9. The method according to claim 1 wherein the server provides the transaction key for checking transaction data created by using an alleged transaction key.

10. The method according to claim 8 wherein the key provisioning server encrypts the transaction key before provisioning the transaction key to the transaction unit.

11. The method according to claim 8, wherein the key provisioning server is adapted to send multiple transaction keys to the transaction unit at a time.

12. The method according to claim 10 wherein the key provisioning server is adapted to encrypt the transaction key for encrypted storage and for transaction based decryption in the transaction unit.

* * * * *